No. 635,063. Patented Oct. 17, 1899.
I. C. SHRADER.
GIN SAW GUMMER.
(Application filed July 20, 1899.)
(No Model.) 2 Sheets—Sheet 1.
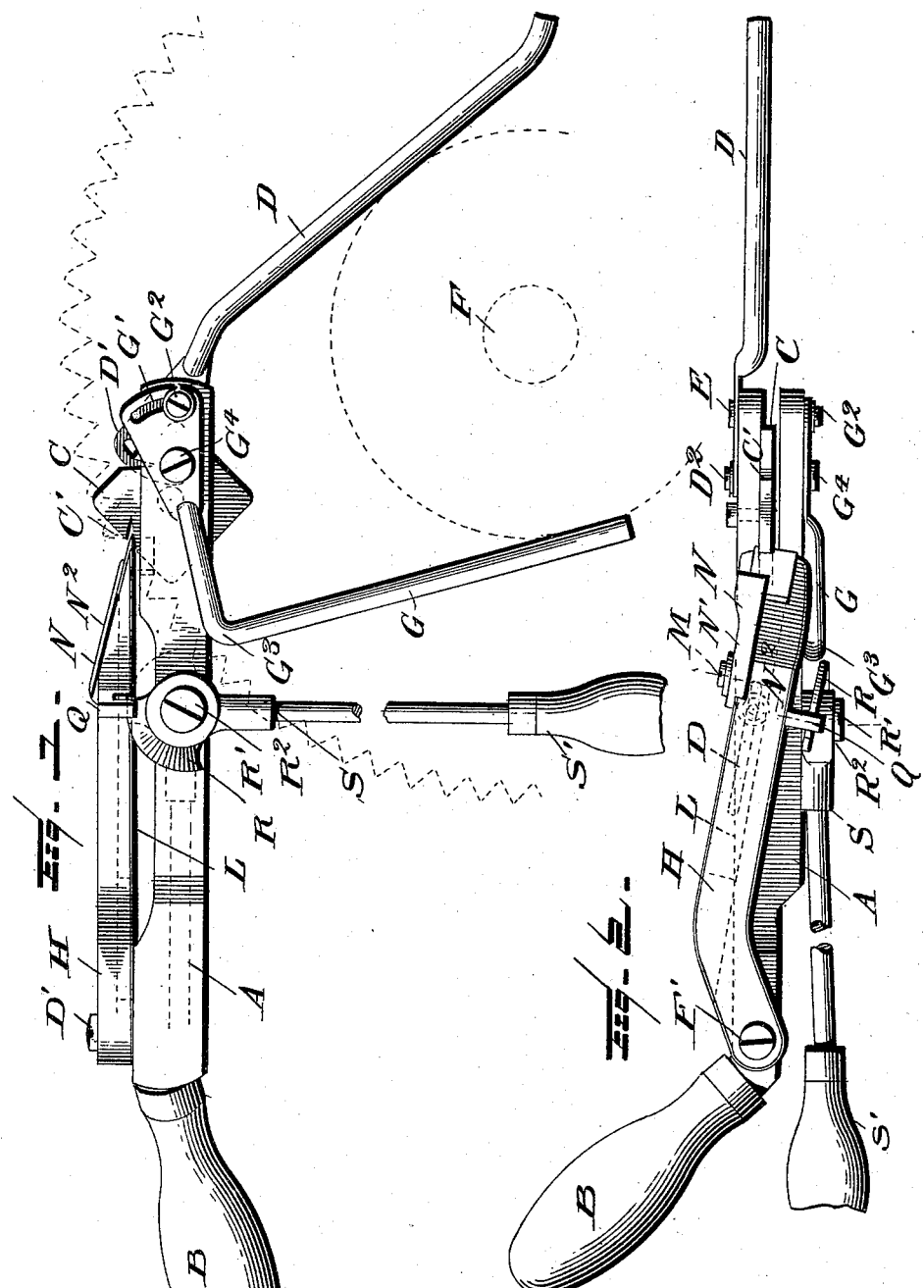
Witnesses
L. C. Hills.
A. L. Hoyt
Inventor
Isaac C. Shrader
By Franklin N. Hoyt
Attorney

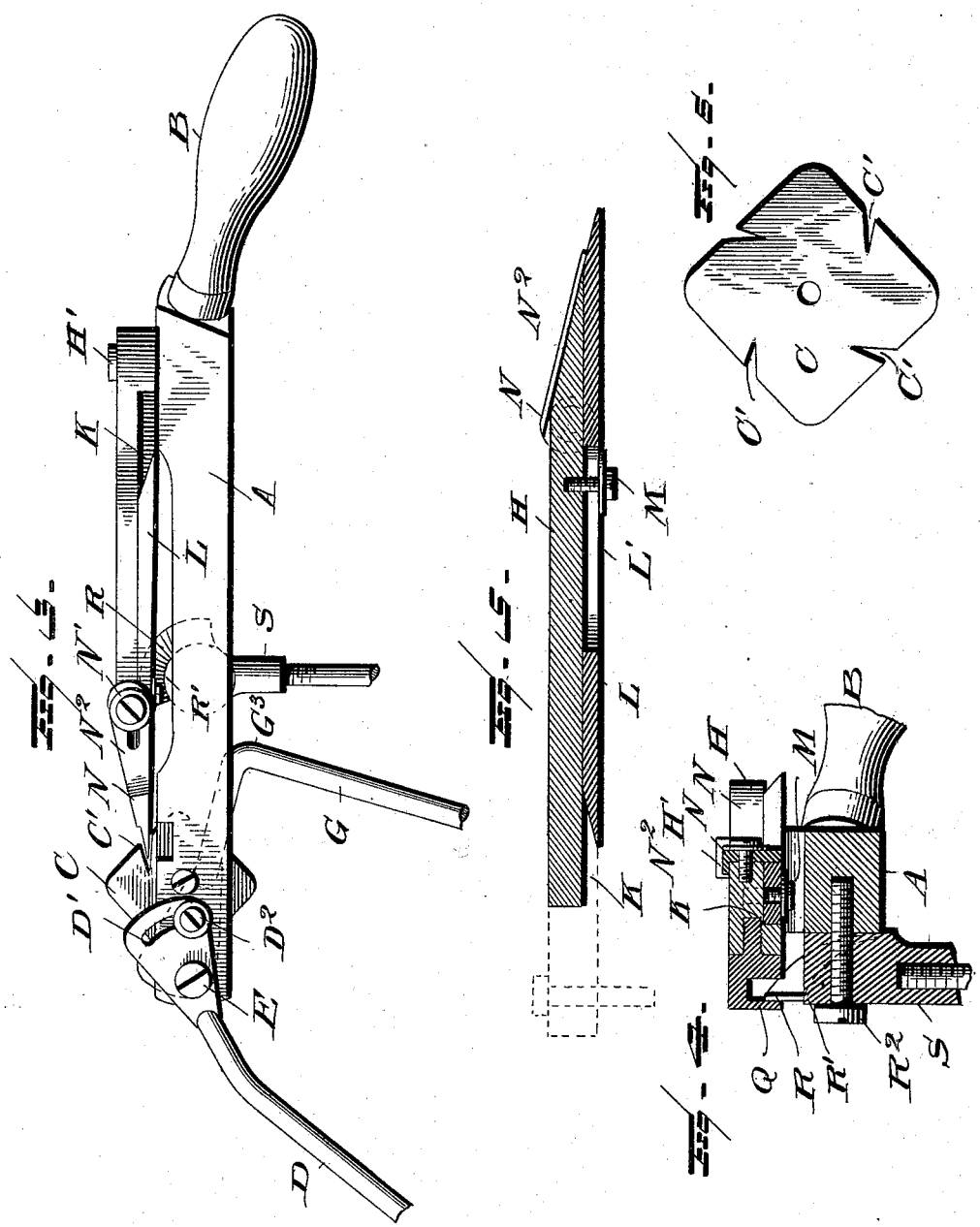

UNITED STATES PATENT OFFICE.

ISAAC C. SHRADER, OF HARPERSVILLE, ALABAMA.

GIN-SAW GUMMER.

SPECIFICATION forming part of Letters Patent No. 635,063, dated October 17, 1899.

Application filed July 20, 1899. Serial No. 724,495. (No model.)

*To all whom it may concern:*

Be it known that I, ISAAC C. SHRADER, a citizen of the United States, residing at Harpersville, in the county of Shelby and State of Alabama, have invented certain new and useful Improvements in Gin-Saw Gummers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in devices for gumming gin-saws; and it consists in providing a simple and efficient device whereby the teeth may be gummed by means of a bit or cutting-knife, which is mounted upon a pivoted holder, actuated by means of a cam-operated lever, a suitable gage being provided to regulate the depth at which the teeth of the saw are to be cut, the cutting bit or knife being reversible and beveled at each end and longitudinally adjustable in its holder.

Another feature of the invention resides in means for regulating the angle at which the teeth are to be cut, which consists in providing an adjustable arm which regulates the pitch at which the cutting-knife is held with relation to the teeth and in the provision of an arm rigidly held to the stock of the device for holding the same steady and rigid during the gumming operation.

To these ends and to such others as the invention may pertain the same consists, further, in the novel construction, combination, and adaptation of parts, as will be hereinafter more fully described and then specifically defined in the appended claim.

My invention is clearly illustrated in the accompanying drawings, which with the letters of reference marked thereon form part of this application and in which drawings similar letters of reference indicate like parts throughout the several views, in which—

Figure 1 is a side elevation showing a shaft carrying a series of gin-saws, showing the manner in which my gummer is applied to the shaft. Fig. 2 is a top plan view of the device. Fig. 3 is an edge view. Fig. 4 is a cross-sectional view. Fig. 5 is a longitudinal sectional view through the entire knife. Fig. 6 is a detail view.

Reference now being had to the details of the drawings by letter, A designates the stock of the device, which has a suitable handle B secured at one end of the stock and preferably at an obtuse angle to its length, and slightly downwardly inclined and mounted in the opposite end of the stock in a slot therein is a die C, which is preferably square in outline and has a series of recesses $C'$, which conform to the different-sized teeth of the gin-saws, which are held in contact with said die during the gumming operation. This plate is mounted so as to rotate within the slot of the stock, whereby a particular die may be turned so as to come opposite the cutting-knife. This die is mounted upon an adjusting-screw, as shown.

Mounted on one face of the stock is an adjusting-bar D, which has an elongated and curved slot $D'$ therein, through which aperture a screw $D^2$ passes, whereby the angle at which said bar or rod D with reference to the stock may be adjusted. This adjusting-rod D turns on a pivot E, and its rear end is held in an adjusted position by means of the screw $D^2$. The outer free end of said adjusting-bar is preferably turned at a slight angle, and the under portion of said bar is adapted to rest against the shaft F, on which the gin-saws are mounted. On the opposite face of the stock from that to which the said adjusting-rod is connected is pivoted a bar G, which has an elongated transverse slot $G'$ therein, and passing through this slot is a screw $G^2$, whereby said bar G, which is bent at a right angle at $G^3$ and mounted upon a pivotal screw $G^4$, may be adjusted. The upper portion of this bar G is adapted to rest against the under portion of the shaft carrying the gin-saws, as shown, for the purpose of holding the stock firmly while the teeth of the saw are gummed.

The saw which is to be gummed is held between the bifurcated or slotted end of the stock and against the die, as before described, and by means of said rods the instrument is held so that the gumming-knife will cut the teeth truly.

Mounted upon the upper face of the stock is the knife-carrying lever H, being pivoted to said stock at $H'$. The under face of this lever is recessed away, as shown in the drawings at K, and sliding longitudinally in this recess is the double-ended cutting knife or bit L, the ends of which are slightly inclined and the shank portion of said cutting-knife has an elongated slot L', and passing through said slot and secured to the lever is a tightening-screw M, whereby said knife may be held in a fixed position with reference to said lever, the under face of the knife and the lever being preferably flush. Adjustably held upon one edge of said knife-carrying lever is a gage N, being pivoted at N' to said lever, and this gage is recessed on its inner face, which is adjacent to the lever, and a portion of the gage extends over the beveled face of the lever and the beveled end of the cutting-knife which extends out flush with the beveled portion of said lever. This gage N has a shouldered portion $N^2$, which is cut slightly on the arc of a circle and is adapted to be adjusted to the tooth which is to be gummed. Extending laterally from the opposite face of the lever from that to which the gage is connected is a recessed plate Q, said recessed portion being adapted to travel upon the cam R, which is formed on the pivoted head R', said head being held to the side of the stock by means of the screw $R^2$. To this head is connected the shank portion S of the handle S', the latter being outwardly bent for convenience in operation. It will thus be seen that as the cam-head is rocked on its pivot the free end of the lever carrying the gage and cutting-knife will be swung back and forth with the cutting edge and gage passing between the teeth of the saw.

The cutting-knife may be adjusted or disposed at any desired angle, as may be found most expedient.

In operation my device is adjusted to the shaft or arbor on which the gin-saws are keyed. The bar D is adjusted on its pivot, so as to tilt the device to adjust the same to the particular saw being gummed, and after setting the gage the teeth of the saw are brought adjacent to the die through which the gage and knife work, and by pulling up on the operating-handle the edge of the tooth may be readily gummed, and by the provision of the rods D and G the device is held rigidly while each tooth is being gummed. After a tooth has been gummed the lever is thrown back to its starting position and the machine moved slightly until a second tooth comes in proper position opposite the die, after which the same operation is repeated until all the teeth about the circumference of the saw have been properly gummed.

Having thus described my invention, what I claim to be new, and desire to secure by Letters Patent, is—

The improved saw-gummer herein described, consisting of the stock, with handle, at one end and a slot at the other, a die mounted in said slot, an adjusting-bar mounted on one face of the stock and having an elongated curved slot, an adjusting-screw disposed in said slot, the free end of said bar being turned at an angle, a bar pivoted on the opposite side of the stock and having an elongated slot, a screw passed through said slot, the said bar being bent at substantially a right angle, a knife-carrying lever pivotally mounted upon the upper face of the stock, and recessed upon its under face, a knife mounted to slide in said recess, means for holding the knife in its adjusted position, a gage adjustable upon the said lever and recessed upon its under face, and having shouldered portion, a recessed plate extending laterally from the lever on the side opposite the gage, a cam formed on a pivoted head and a handle connected to said head and bent outwardly, all substantially as and for the purpose specified.

In testimony whereof I affix my signature in presence of two witnesses.

ISAAC C. SHRADER.

Witnesses:
MATHEW S. WILSON,
JNO. T. GLAZE.